US012674692B2

(12) United States Patent
Ban et al.

(10) Patent No.: US 12,674,692 B2
(45) Date of Patent: Jul. 7, 2026

(54) LINEAR VARIABLE DIFFERENTIAL PITOT TUBE

(71) Applicant: UNIVERSITY OF PITTSBURGH—OF THE COMMONWEALTH SYSTEM OF HIGHER EDUCATION, Pittsburgh, PA (US)

(72) Inventors: Heng Ban, Wexford, PA (US); Gregory E.J. Kinzler, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 240 days.

(21) Appl. No.: 18/474,469

(22) Filed: Sep. 26, 2023

(65) Prior Publication Data

US 2024/0102836 A1     Mar. 28, 2024

Related U.S. Application Data

(60) Provisional application No. 63/377,107, filed on Sep. 26, 2022.

(51) Int. Cl.
G01F 1/46 (2006.01)

(52) U.S. Cl.
CPC ..................................... G01F 1/46 (2013.01)

(58) Field of Classification Search
CPC ........... G01D 5/2291; G01F 1/38; G01F 1/46; G01P 5/16; G01P 5/165
See application file for complete search history.

(56) References Cited

U.S. PATENT DOCUMENTS

| | | | | |
|---|---|---|---|---|
| 2,503,851 A * | 4/1950 | Snow | ................... | G01D 5/2291 |
| | | | | 340/678 |
| 3,308,411 A * | 3/1967 | Roshala | ............... | G01L 9/0085 |
| | | | | 29/595 |
| 4,149,133 A * | 4/1979 | Hilgert | ................. | G01D 5/2258 |
| | | | | 336/134 |
| 10,801,634 B2 * | 10/2020 | Lukito | ...................... | G01F 1/24 |
| 12,012,978 B2 * | 6/2024 | Schmidt | .............. | F16K 37/0041 |
| 2019/0113367 A1 * | 4/2019 | Cis | .......................... | H01F 27/28 |

OTHER PUBLICATIONS

Standard RDT C 4-7T. Eddy-current probe type flow sensor for liquid metal service. United States Atomic Energy Commission Division of Reactor Research and Development, Jun. 1973.

(Continued)

*Primary Examiner* — Justin N Olamit
(74) *Attorney, Agent, or Firm* — Philip E. Levy; Eckert Seamans Cherin & Mellott, LLC

(57) ABSTRACT

A linear variable differential pitot tube includes a primary solenoid, a first secondary solenoid, a second secondary solenoid, wherein the primary solenoid is positioned in between the first secondary solenoid and the second secondary solenoid, wherein the first secondary solenoid and the first secondary solenoid have identical geometries, and a high permeability magnetic core, the high permeability magnetic core being structured to move relative to the primary solenoid, the first secondary solenoid, and the second secondary solenoid. Also, a system and method for measuring the localized velocity of a flow of a fluid using the linear variable differential pitot tube.

11 Claims, 2 Drawing Sheets

(56) References Cited

OTHER PUBLICATIONS

J. Brewer and R. Jaross. Eddy-Current Probe Type Sodium Flowsensor for FFTF Reactor Channel Flow Monitoring. Argonne National Laboratory, 1970.

J. Costello, R. L. Laubham, W. R. Miller, and C. R. Smith. FFTF probetype eddycurrent flowmeter: Wet versus dry performance evaluation in sodium. Nuclear Technology, 19(3):174-180, 1973. doi:10.13182/NT73-3.

Cetiner, S. M., Oleksak, K. M., Warmack, R. J., Roberts, M. J., Ericson, M. N., & Fathy, A. (2019). Preliminary Design Study for an Eddy Current Flow Meter for Versatile Test Reactor (No. ORNL/TM-2019/1207). Oak Ridge National Lab. (ORNL), Oak Ridge, TN (United States).

* cited by examiner

LINEAR VARIABLE DIFFERENTIAL PITOT TUBE

CROSS REFERENCE TO RELATED APPLICATIONS

This application claims priority to U.S. Provisional Patent Application Ser. No. 63/377,107, filed on Sep. 26, 2022 and titled "Linear Variable Differential Pitot Tube", the contents of which are incorporated herein by reference.

FIELD OF THE INVENTION

The disclosed concept relates generally to devices for measuring the localized flow velocity of a fluid, and, in particular, to a linear variable differential pitot tube for measuring fluid flow velocity.

BACKGROUND OF THE INVENTION

Currently in the advanced nuclear reactor and solar industries, measuring the localized velocity of fluid flow and determining the flow profile is a challenge that has not been directly overcome. Traditionally, in the advanced nuclear reactor industry, ultrasonic doppler sensors have been used to map localized flow conditions. However, due to curie temperature of piezoelectric materials, these sensors cannot operate at high temperature (i.e., operational temperatures of 600° C. or above) without the addition of a wave guide. The addition of a wave guide, however, causes a lower signal to noise ratio, which can be difficult to filter under operational conditions.

SUMMARY OF THE INVENTION

These needs, and others, are met by a linear variable differential pitot tube that includes a primary solenoid, a first secondary solenoid, a second secondary solenoid, wherein the primary solenoid is positioned in between the first secondary solenoid and the second secondary solenoid, wherein the first secondary solenoid and the first secondary solenoid have identical geometries, and a high permeability magnetic core, the high permeability magnetic core being structured to move relative to the primary solenoid, the first secondary solenoid, and the second secondary solenoid.

In another embodiment, a system for measuring a localized velocity of a flow of a fluid is provided. The system includes the linear variable differential pitot tube described above, an AC current source coupled to the primary solenoid for providing an alternating current to the primary solenoid for exciting the primary solenoid, a voltage sensing assembly for sensing a first voltage of the first secondary solenoid and outputting a first signal indicative of the first voltage and sensing a second voltage of the second secondary solenoid and outputting a second signal indicative of the second voltage, and a controller coupled to the voltage sensing assembly, the controller being structured and configured to receive the first signal and the second signal and to determine the localized velocity based on the first signal and the second signal.

In still another embodiment, a method for measuring a localized velocity of a flow of a fluid using the linear variable differential pitot tube described above is provided. The method includes providing an alternating current to the primary solenoid of the linear variable differential pitot tube for exciting the primary solenoid, sensing a first voltage of the first secondary solenoid and outputting a first signal indicative of the first voltage and sensing a second voltage of the second secondary solenoid and outputting a second signal indicative of the second voltage, and receiving the first signal and the second signal and determining the localized velocity based on the first signal and the second signal.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
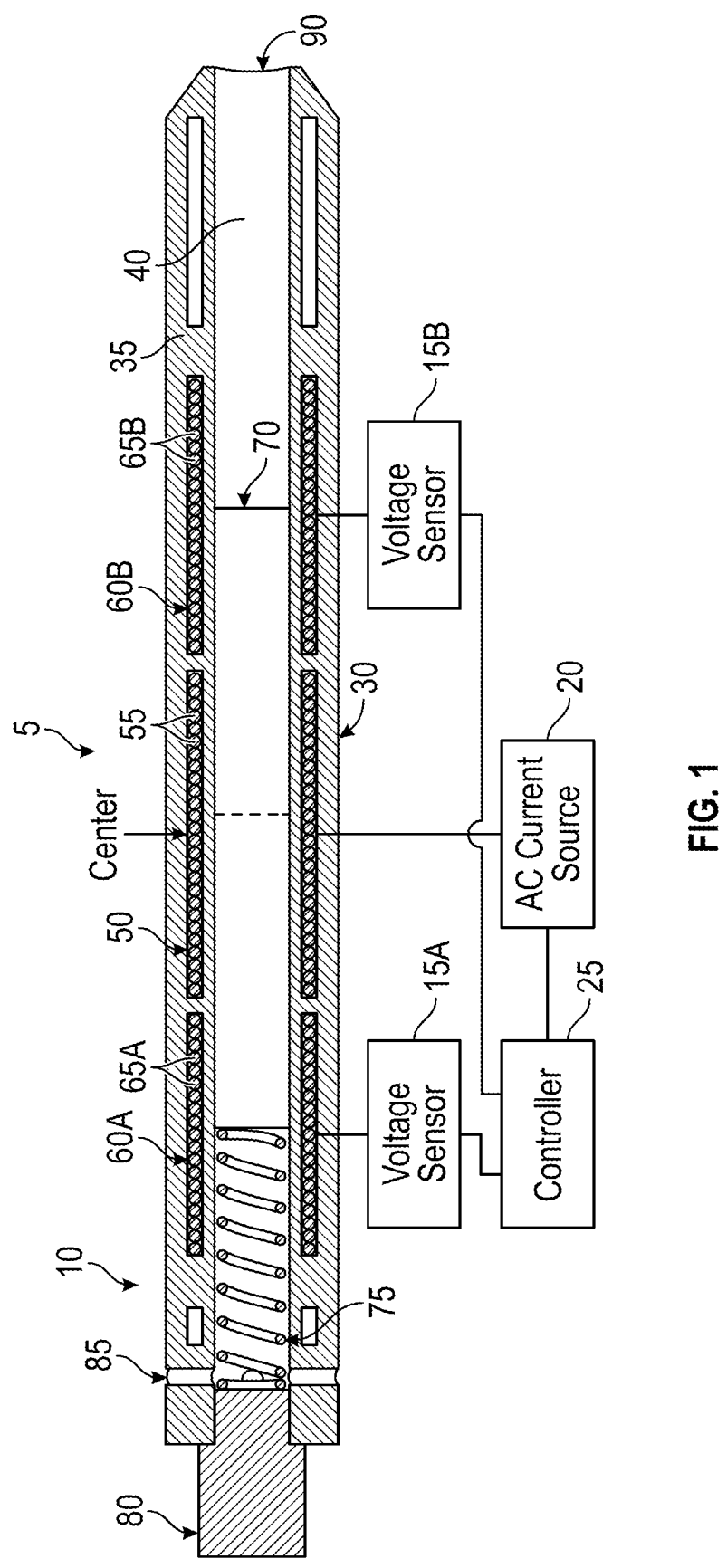
FIG. 1 is a schematic diagram of a system for measuring the localized velocity of the flow of a fluid according to an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the term "controller" shall mean a programmable analog and/or digital device (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the term "high permeability" shall mean a material that has a permeability similar to or larger than iron (which has a permeability of $6.3 \times 10{-}3$ H/m).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

The disclosed concept, as described herein, provides a linear variable differential pitot tube (LVDPT) sensor that can operate directly in the flow of a fluid under high temperature conditions while maintaining a high signal to noise ratio. The disclosed concept thus effectively allows for direct measurement of localized flow at high temperature. In particular, the disclosed concept, in the exemplary embodiment, provides an LVDPT that includes a primary solenoid, two geometrically identical secondary solenoids, and a high permeability magnetic core. The primary solenoid is excited by an alternating current, which produces a time varying magnetic field that induces voltage on the two secondary solenoids through the principle of mutual inductance. Due to the symmetry of the system, when the center of the high permeability core is located at the center of the primary coil, the output voltages of the secondary solenoids will be the same. However, when the core moves in either direction, the voltage of the secondary solenoids will change; indicating that the sensor output is coupled with the linear motion of the core. Similar to a traditional pitot tube, the movement of the core will be driven by the relationship between the dynamic and static pressure of the flow surrounding the sensor. Changing flow will change the dynamic pressure, causing the core to move and induce a voltage that can be directly correlated to the localized velocity of the flow.

FIG. 1 is a schematic diagram of a system 5 for measuring the localized velocity of the flow of a fluid, such as, without limitation, the flow of coolants in the nuclear industry or the flow of heat transfer fluids in the solar industry according to an exemplary embodiment of the disclosed concept. As seen in FIG. 1 and as described in more detail below, system 5 includes an LVDPT 10, first and second voltage sensors 15A and 15B, an AC current source 20, and a controller 25.

LVDPT 10 includes a cylindrical housing 30 having an outer wall 35 which defines an inner bore 40. Wall 35 holds therein a primary solenoid 50 comprising a coil of wire 55 wound about bore 40. Wall 35 also holds therein a secondary solenoid 60A comprising a coil of wire 65A wound about bore 40, and therein a secondary solenoid 60B comprising a coil of wire 65B wound about bore 40. Secondary solenoid 65A and secondary solenoid 65B have identical geometries. Primary solenoid 50 is positioned between secondary solenoid 65A and secondary solenoid 65B within wall 35. A high permeability magnetic core 70 is moveably received and held within bore 40 such that high permeability magnetic core 70 is free to move linearly within bore 40 of cylindrical housing 30. High permeability magnetic core 70 is made of ferromagnetic metal such as iron, or ferrimagnetic compounds such as ferrites. In addition, a spring 75 is positioned within bore 40 between a terminal end of high permeability core 70 and a spring adjustment mechanism 80 that is positioned at a terminal end of housing 30. Spring adjustment mechanism 80 is structured to selectively adjust a tension of spring 75. In the exemplary embodiment, the spring adjustment mechanism 80 is used prior to operation to calibrate the device during non-flow conditions. Also provided at the terminal end of housing 30 is a static inlet 85. Static inlet is structured to provide an inlet for static pressure of the surrounding flow. A stagnation pressure inlet 90 is provided at the other terminal end of housing 40 opposite spring adjustment mechanism 80. Stagnation pressure inlet is structured to provide an inlet for the stagnation pressure contributed by the surrounding flow.

As seen in FIG. 1, AC current source 20 is operatively coupled to primary solenoid 50. AC current source 20 is structured and configured to, under control of controller 25, provide an alternating current that excites primary solenoid 50. The excitation of primary solenoid 50 by the alternating current produces a time varying magnetic field that induces voltage on the two secondary solenoids 60A and 60B through the principle of mutual inductance. Voltage sensor 15A is operatively coupled to secondary solenoid 60A and is structured and configured to generate an output that is indicative of the voltage that is induced on secondary solenoid 60A. Similarly, voltage sensor 15B is operatively coupled to secondary solenoid 60B and is structured and configured to generate an output that is indicative of the voltage that is induced on secondary solenoid 60B. Voltage sensors 15A and 15B may each be any type of suitable voltage sensing device, such as, without limitation, an electrostatic sensor, a piezoelectric sensor, an optical sensor, or an inductive sensor, and may provide as its output a voltage signal or a current signal. Voltage sensors 15A and 15B are coupled to controller 25 such that the output of each of voltage sensors 15A and 15B is provided to controller 25 for use thereby as described herein.

Figure 2:
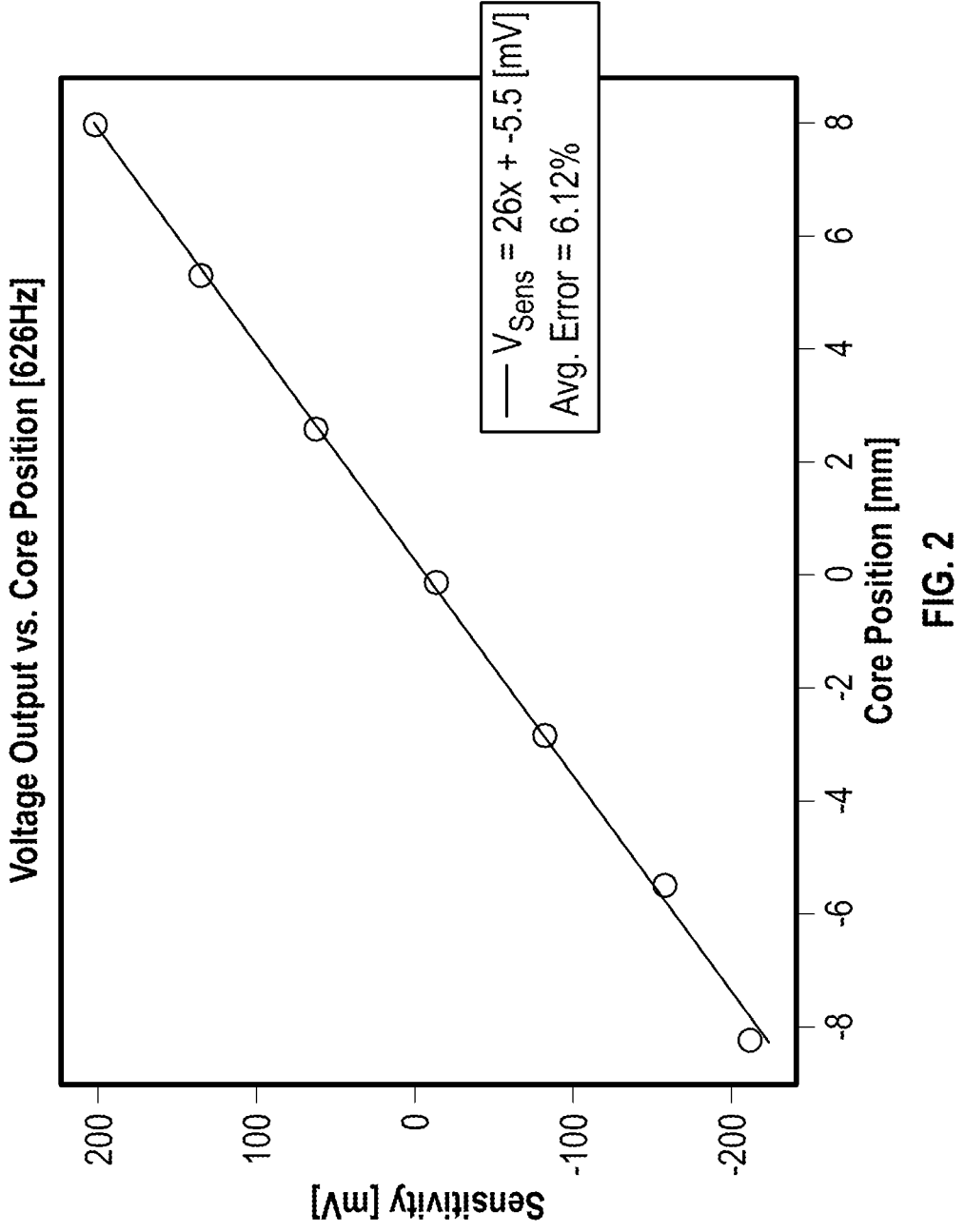
FIG. 2 is a plot showing voltage v. core position according to an exemplary embodiment of the disclosed concept.

During operation of LVDPT 10, AC current source 20 continually provides an alternating current to primary solenoid 50. Since secondary solenoid 65A and secondary solenoid 65B have identical geometries, if the center of high permeability core 70 (identified by the dotted lines in FIG. 1) is located at the center of primary coil 50 (identified by the arrow in FIG. 1), the output voltages of the secondary solenoids 60A and 60B will be the same. However, if high permeability core 70 is caused to move in either direction linearly along bore 40 and away from center, the voltages of the secondary solenoids 60A and 60B will be caused to change and be different from one another. This is illustrated in FIG. 2, which is a plot of the voltage output of an exemplary LVDPT 10 (e.g., voltage output=voltage measured by voltage sensor 15B–voltage measured by measured by voltage sensor 15A) versus the position of high permeability core 70. Thus, in LVDPT 10, the sensor output thereof (which is based on the outputs of voltage sensors 15A and 15B) is coupled with the linear motion of high permeability core 70. In particular, the movement of high permeability core 70 will be driven by the relationship between the dynamic and static pressure of the flow surrounding LVDPT 10. Changing flow will change the dynamic pressure, thereby causing high permeability core 70 to move linearly within bore 40. As a result, differing voltages are induced on secondary solenoids 60A and 60B. Those voltages are measured by voltage sensors 15A and 15B, and signals indicative thereof are provided to controller 25. Controller 25 may then directly correlate those measured voltages to the localized velocity of the flow surrounding LVDPT 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A linear variable differential pitot tube, comprising:
a primary solenoid;
a first secondary solenoid;
a second secondary solenoid, wherein the primary solenoid is positioned in between the first secondary solenoid and the second secondary solenoid, wherein the first secondary solenoid and the second secondary solenoid have identical geometries; and a high permeability magnetic core, the high permeability magnetic core being structured to move relative to the primary solenoid, the first secondary solenoid, and the second secondary solenoid; and a cylindrical housing having a wall and an inner bore, wherein the primary solenoid, the first secondary solenoid, and the second secondary solenoid are provided within the wall, and wherein the magnetic core is movable linearly along a longitudinal axis of the housing within the bore, wherein the longitudinal axis defines a flow direction through the housing, wherein the housing includes: (i) a static inlet provided in the wall adjacent a first end of the housing, the static inlet having a longitudinal axis that extends transversely to the longitudinal axis and the flow direction through the housing, and (ii) a stagnation pressure inlet provided at a second, terminal end of the housing opposite the first end of the housing, wherein the stagnation pressure inlet comprises an axial opening about the longitudinal axis of the housing that faces and is aligned with the flow direction through the housing, and wherein the primary solenoid, the first secondary solenoid and the second secondary solenoid are positioned in between the static inlet and the stagnation pressure inlet.

2. The linear variable differential pitot tube according to claim 1, wherein the first secondary solenoid is positioned adjacent to a first end of the primary solenoid and the second secondary solenoid is positioned adjacent to a second end of the primary solenoid opposite the first end of the primary solenoid.

3. The linear variable differential pitot tube according to claim 2, further comprising a spring having a first end coupled to an end of the magnetic core and a second end coupled to a first end of the housing.

4. The linear variable differential pitot tube according to claim 3, further comprising a spring tension adjuster coupled to the first end of the housing and to the spring for adjusting a tension of the spring prior to implementation in a flow of fluid surrounding the linear variable differential pitot tube.

5. The linear variable differential pitot tube according to claim 4, wherein the spring is located immediately adjacent to the static inlet.

6. A system for measuring a localized velocity of a flow of a fluid, comprising:

a linear variable differential pitot tube according to claim 1;

an AC current source coupled to the primary solenoid for providing an alternating current to the primary solenoid for exciting the primary solenoid;

a voltage sensing assembly for sensing a first voltage of the first secondary solenoid and outputting a first signal indicative of the first voltage and sensing a second voltage of the second secondary solenoid and outputting a second signal indicative of the second voltage; and a controller coupled to the voltage sensing assembly, the controller being structured and configured to receive the first signal and the second signal and to determine the localized velocity based on the first signal and the second signal.

7. The system according to claim 6, wherein the first secondary solenoid is positioned adjacent to a first end of the primary solenoid and second secondary solenoid is positioned adjacent to a second end of the primary solenoid opposite the first end.

8. The system according to claim 6, wherein the linear variable differential pitot tube comprises a spring having a first end coupled to an end of the magnetic core and a second end coupled to a first end of the housing.

9. The system tube according to claim 8, wherein the linear variable differential pitot tube comprises a spring tensions adjuster coupled to the first end of the housing and to the spring for adjusting a tension of the spring.

10. The system according to claim 9, wherein the spring is located immediately adjacent to the static inlet.

11. A method of measuring a localized velocity of a flow of a fluid, comprising:

providing an alternating current to the primary solenoid of a linear variable differential pitot tube according to claim 1 for exciting the primary solenoid;

sensing a first voltage of the first secondary solenoid and outputting a first signal indicative of the first voltage and sensing a second voltage of the second secondary solenoid and outputting a second signal indicative of the second voltage; and receiving the first signal and the second signal and determining the localized velocity based on the first signal and the second signal.

*     *     *     *     *